United States Patent
Tan

(10) Patent No.: US 10,967,323 B2
(45) Date of Patent: Apr. 6, 2021

(54) EXHAUST GAS PURIFYING AND HEAT RECOVERING SYSTEM AND METHOD FOR SLUDGE TREATMENT

(71) Applicant: Swison Creative Environmental Solutions Co., Ltd., Guangdong (CN)

(72) Inventor: Wei Tan, Guangdong (CN)

(73) Assignee: Swison Creative Environmental Solutions Co., Ltd., Guangdong (CN)

( * ) Notice: Subject to any disclaimer, the term of this patent is extended or adjusted under 35 U.S.C. 154(b) by 0 days.

(21) Appl. No.: 16/008,664

(22) Filed: Jun. 14, 2018

(65) Prior Publication Data
US 2018/0361302 A1 Dec. 20, 2018

(30) Foreign Application Priority Data

Jun. 15, 2017 (CN) .......................... 201710452198.0

(51) Int. Cl.
*B01D 47/02* (2006.01)
*C02F 11/12* (2019.01)
(Continued)

(52) U.S. Cl.
CPC ............ *B01D 47/02* (2013.01); *B01D 53/005* (2013.01); *B01D 53/343* (2013.01); *B01D 53/44* (2013.01); *B01D 53/75* (2013.01); *B01D 53/78* (2013.01); *C02F 1/041* (2013.01); *C02F 11/12* (2013.01); *F25B 30/02* (2013.01); *F28D 7/1607* (2013.01);
(Continued)

(58) Field of Classification Search
None
See application file for complete search history.

(56) References Cited

U.S. PATENT DOCUMENTS 4,429,643 A 2/1984 Mulholland

FOREIGN PATENT DOCUMENTS

CN 101774743 A 7/2010
DE 3513159 A1 10/1986
(Continued)

OTHER PUBLICATIONS

Fujiwara et al. (JP2017-000983A)—translated document (Year: 2017).*

(Continued)

*Primary Examiner* — Jelitza M Perez
(74) *Attorney, Agent, or Firm* — Taft Stettinius & Hollister LLP

(57) ABSTRACT

An exhaust gas purifying and heat recovering system and method for sludge treatment. The system comprises: a first heat exchange flow path including first, second, and third heat exchangers, a first heat exchange medium that is circulated in the first heat exchange flow path to heat process gas for sludge treatment in the first heat exchanger, a second purification and heat exchange flow path including a heat exchange tank containing a second liquid heat exchange medium and which receives the exhaust gas after sludge treatment, and a third dirty liquid separation flow path including a dirty liquid separation tank provided between a dirty liquid outlet of the heat exchange tank and a clean liquid inlet of the heat exchange tank for separating the dirty liquid after purging the exhaust gas, the separated liquid being again directed to the clean liquid inlet of the heat exchange tank.

20 Claims, 3 Drawing Sheets

(51) Int. Cl.
    *B01D 53/00*     (2006.01)
    *B01D 53/75*     (2006.01)
    *F25B 30/02*     (2006.01)
    *F28D 7/16*     (2006.01)
    *B01D 53/34*     (2006.01)
    *B01D 53/78*     (2006.01)
    *B01D 53/44*     (2006.01)
    *C02F 1/04*     (2006.01)
    *C02F 11/18*     (2006.01)

(52) U.S. Cl.
    CPC ......... *C02F 11/18* (2013.01); *C02F 2201/004* (2013.01); *C02F 2201/005* (2013.01); *C02F 2301/046* (2013.01); *C02F 2303/02* (2013.01); *C02F 2303/10* (2013.01)

(56) References Cited

FOREIGN PATENT DOCUMENTS

| | | | |
|---|---|---|---|
| EP | 0552583 A1 | | 7/1993 |
| JP | 2017000983 A | * | 1/2017 |

OTHER PUBLICATIONS

European Patent Office, Extended European Search Report issued in corresponding European application No. 8171678.8, dated Jul. 27, 2018, 15 pp.

* cited by examiner

EXHAUST GAS PURIFYING AND HEAT RECOVERING SYSTEM AND METHOD FOR SLUDGE TREATMENT

TECHNICAL FIELD

The present invention relates to an exhaust gas purifying and heat recovering system and method for sludge treatment, and more particularly to an exhaust gas purifying and heat recovering system and method for sludge drying.

BACKGROUND

With the continuous development of urbanization, the amount of sewage which is generated in industrial production and daily life and which needs to be treated gradually increases, and as by-product of sewage treatment, output amount of the sludge also increases. However, sludge treatment is more difficult than sewage treatment. At present, sludge drying treatment is a relatively effective sludge treatment method. A superior drying treatment method usually adopts the direct type drying, and the dried drying media is recovered and reused.

Chinese invention patent CN201010101024.8 discloses a latent-heat-exchange-type multi-phase change sludge drying method and apparatus. This apparatus generally introduces vapor to dry the sludge after the dehydrated sludge is transported into a dryer. By constantly stirring the sludge, the sludge is sufficiently heated and evaporated out of the moisture, to achieve the purpose of drying. A latent heat pump is used to recover the vapor after the sludge is dried, and the heat energy therein is passed to a vapor generating device to generate low-temperature vapor as a supplemental heat source for drying, which is then used for sludge drying, and the exhaust gas filtered by the biological filter is harmlessly discharged into the atmosphere. The apparatus and method adopted in this patent document can dry the sludge by low-temperature vapor and the heat of the vapor in the generated exhaust gas is exchanged by the latent heat exchange pump, and the recovered heat is used as heat source for sludge drying, thereby achieving thermal cycling.

During the process of sludge drying, a large amount of exhaust gas will be released, the composition thereof is complex and diverse, which is a mixture of various organic and inorganic gases, which, if be directly discharged, will cause serious secondary pollution to the surrounding environment, will seriously damage human life's environment, and will cause loss of heat.

Therefore, there are some exhaust gas treatment methods, such as biological filtration, exhaust gas absorption tower, precipitator, etc. However, they are now difficult to achieve processing functions such as effective exhaust gas treatment and heat recovery, etc., a lot of dried exhaust gas is discharged once treated, while the heat carried by the exhaust gas is not recycled and reused, thereby increasing the energy cost of drying. Even with heat recovery apparatus, heat recovery is often inefficient, and the sludge impurities contained in the exhaust gas can clog the heat recovery apparatus, causing corrosion.

Although the apparatus of the above patent or the prior art is able to realize heat recovery and reuse of the exhaust gas after the sludge drying, the sludge impurities carried in the exhaust gas during the sludge drying process can clog the apparatus and affect the efficiency of heat recovery.

Thus, there is a need for systems and methods that can efficiently perform exhaust gas purifying and heat recovery during sludge drying.

SUMMARY

In order to solve the above problems, the present invention proposes an exhaust gas purifying and heat recovering system and method for sludge treatment.

According to an aspect of the present invention, there is provided an exhaust gas purifying and heat recovering system for sludge treatment, comprising:

a first heat exchange flow path including a first heat exchanger, and a second heat exchanger and a third heat exchanger arranged downstream of the first heat exchanger, a first heat exchange medium is circulated in the first heat exchange flow path, to heat process gas for sludge treatment in the first heat exchanger, the heated process gas is directed to a sludge treatment device, generating a sludge treated exhaust gas;

a second purification and heat exchange flow path including a heat exchange tank containing a second liquid heat exchange medium, the sludge treated exhaust gas is discharged into the heat exchange tank, hence, generating a dirty liquid, is purged by the second liquid heat exchange medium in the heat exchange tank, and transfers the heat to the second liquid heat exchange medium so as to be cooled, the second heat exchanger is in heat exchange relationship with the second liquid heat exchange medium in the heat exchange tank to transfer heat of the second liquid heat exchange medium to the first heat exchange medium in the second heat exchanger;

a fourth purified gas recovery flow path, the cooled exhaust gas from the heat exchange tank flows through the third heat exchanger to exchange heat with the first heat exchange medium flowing through the third heat exchanger, and flows through the fourth purified gas recovery flow path, at least a portion of the exhaust gas after being heat exchanged is directed back to the first heat exchanger via an intake port to recycle the process gas; and a third dirty liquid separation flow path including a dirty liquid separation tank provided between a dirty of the heat exchange tank and a clean liquid inlet of the heat exchange tank, for separating the dirty liquid after purging the cooled exhaust gas, and the separated liquid is again directed to the clean liquid inlet of the heat exchange tank.

Preferably, the exhaust gas purifying and heat recovering system further comprises a gas gathering device disposed above the heat exchange tank for collecting the cooled exhaust gas from the heat exchange tank, the cooled exhaust gas collected by the gas gathering device flows through the third heat exchanger for heat exchanging with the first heat exchange medium flowing through the third heat exchanger before the exhaust gas after being heat exchanged, is directed back to the first heat exchanger.

Preferably, the second heat exchanger is arranged in series upstream or downstream of the third heat exchanger.

Preferably, the second heat exchanger is arranged in parallel with the third heat exchanger.

Preferably, a defoaming device is arranged downstream of the third heat exchanger for defoaming the exhaust gas after being heat exchanged, before the exhaust gas is directed back to the first heat exchanger.

Preferably, the first heat exchange flow path is constituted by a heat exchange circuit comprising a compressor arranged upstream of the first heat exchanger and a throttle valve arranged downstream of the first heat exchanger and upstream of the second heat exchanger, the compressor is used for compressing the first heat exchange medium and directing the compressed first heat exchange medium to the first heat exchanger, wherein the first heat exchange medium heats the process gas in the first heat exchanger and then flows into the second heat exchanger via the throttle valve.

Preferably, a gas distribution device is disposed upstream of an intake conduit of the heat exchange tank for receiving the sludge treated exhaust gas from the sludge treatment device and for enabling the sludge-treated exhaust gas to evenly enter the heat exchange tank.

Preferably, the heat exchange tank includes a clean liquid inlet and a waste liquid outlet disposed near the bottom of the heat exchange tank, and a dirty liquid outlet disposed at an upper portion of the heat exchange tank; when needs to be replenished, the second liquid heat exchange medium is introduced into the heat exchange tank from the clean liquid inlet; when the level in the heat exchange tank reaches the dirty liquid outlet, the second liquid heat exchange medium flows out from the dirty liquid outlet; when the heat exchange tank needs to be purged, the liquid heat exchange medium is discharged from the waste liquid outlet.

Preferably, the exhaust gas purifying and heat recovering system further includes a fifth compressed gas flow path including a compressed gas inlet disposed near the bottom of the heat exchange tank, a control valve, a conduit near the bottom of the heat exchange tank, the control valve is configured to introduce compressed gas into the conduit via the compressed gas inlet as required and to inject compressed gas into the second liquid heat exchange medium of the heat exchange tank through a plurality of apertures provided on the conduit, and then to discharge the compressed gas with the cooled exhaust gas.

Preferably, the second liquid heat exchange medium is one or more of water, cleaning liquid and ionic liquid.

Preferably, the second heat exchanger is disposed inside the heat exchange tank.

Preferably, the sludge treated exhaust gas is discharged into the heat exchange tank below a level of the second liquid heat exchange medium in the heat exchange tank.

Preferably, the heat exchange tank is provided with an intake conduit below the level.

Preferably, the process gas is air.

Preferably, the process gas is fed from the first heat exchanger to the sludge treatment device by a ventilation device, wherein the sludge treatment device is a sludge drying device.

According to an aspect of the present invention, there is provided an exhaust gas purifying and heat recovering method for sludge treatment, comprising:

providing a first heat exchange flow path including a first heat exchanger, and a second heat exchanger and a third heat exchanger arranged downstream of the first heat exchanger, a first heat exchange medium is circulated in the first heat exchange flow path, to heat process gas for sludge treatment in the first heat exchanger, the heated process gas is directed to a sludge treatment device, generating a sludge treated exhaust gas;

providing a second purification and heat exchange flow path including a heat exchange tank containing a second liquid heat exchange medium, the sludge treated exhaust gas is discharged into the heat exchange tank, is purged by the second liquid heat exchange medium in the heat exchange tank, hence, generating a dirty liquid and transfers the heat to the second liquid heat exchange medium so as to be cooled, the second heat exchanger is in heat exchange relationship with the second liquid heat exchange medium in the heat exchange tank to transfer heat of the second liquid heat exchange medium to the first heat exchange medium in the second heat exchanger; filling the heat exchange tank with the second liquid heat exchange medium; activating the first heat exchange flow path and the second purification and heat exchange flow path, such that the process gas is heated in the first heat exchanger and then sent to a sludge drying device, the exhaust gas discharged from the sludge drying device is input into the heat exchange tank such that the exhaust gas is purged by the second liquid heat exchange medium and transfers the heat to the second liquid heat exchange medium, so as to be cooled down, flowing the cooled exhaust gas of the heat exchange tank through the third heat exchanger for heat exchange with the first heat exchange medium flowing through the third heat exchanger, and through the fourth purified gas recovery flow path, at least a portion of the exhaust gas after heat exchange is directed back to the first heat exchanger through an intake port to recycle the process gas;

providing a dirty liquid separation tank between a dirty liquid outlet of the heat exchange tank and a clean liquid inlet of the heat exchange tank for separating the dirty water after purging the sludge treated exhaust gas;

directing the separated liquid again to the clean liquid inlet of the heat exchange tank.

Preferably, the method further comprises: disposing a gas gathering device above the heat exchange tank for collecting the cooled exhaust gas from the heat exchange tank, the cooled exhaust gas collected by the gas gathering device flows through the third heat exchanger for exchanging heat with the first heat exchange medium flowing through the third heat exchanger before the exhaust gas after being heat exchanged, is directed back to the first heat exchanger.

Preferably, the second heat exchanger is arranged in series upstream or downstream of the third heat exchanger.

Preferably, the second heat exchanger is arranged in parallel with the third heat exchanger.

Preferably, a defoaming device is arranged downstream of the third heat exchanger for defoaming the exhaust gas after being heat exchanged, before the exhaust gas is directed back to the first heat exchanger.

Preferably, a gas distribution device is disposed upstream of an intake conduit of the heat exchange tank for receiving the sludge treated exhaust gas from the sludge treatment device and for enabling the sludge-treated exhaust gas to evenly enter the heat exchange tank.

Preferably, the heat exchange tank includes a clean liquid inlet and a waste liquid outlet disposed near the bottom of the heat exchange tank, and a dirty liquid outlet disposed at an upper portion of the heat exchange tank; when needs to be replenished, the second liquid heat exchange medium is introduced into the heat exchange tank from the clean liquid inlet; when the level in the heat exchange tank reaches the dirty liquid outlet, the second liquid heat exchange medium flows out from the dirty liquid outlet; when the heat exchange tank needs to be purged, the liquid heat exchange medium is discharged from the waste liquid outlet.

Preferably, the method further comprises: providing a fifth compressed gas flow path including a compressed gas inlet disposed near the bottom of the heat exchange tank, a control valve, a conduit near the bottom of the heat exchange tank, the control valve is configured to introduce compressed gas into the conduit via the compressed gas inlet as required and to inject compressed gas into the second liquid heat exchange medium of the heat exchange tank through a plurality of apertures provided on the conduit, and then to discharge the compressed gas with the cooled exhaust gas.

By means of the exhaust gas purifying and heat recovering systems and methods for sludge treatment of the present invention, air flows from the intake port, at first passes through the compressor, and then flows to the first heat exchanger. The first heat exchanger heats the air, and the heated air is pressurized by the ventilation device and fed to the sludge drying device. In the sludge drying device, heated air is used as a process gas to participate in the sludge drying treatment. After the heated air becomes an exhaust gas with sludge impurities, it is discharged from the sludge drying device and flows into the gas distribution device via a conduit. The sludge treated exhaust gas is collected in the gas distribution device and is discharged into the second liquid heat exchange medium in the heat exchange tank through the intake line, so as to transfer the heat in the sludge treated exhaust gas to the second liquid heat exchange medium, to achieve gas-liquid heat exchange, thereby achieving heat recovery of the exhaust gas. During this heat exchange, the temperature of the sludge treated exhaust gas is lowered and automatically flows up above the level of the second liquid heat exchange medium and is then collected by the gas gathering device. The cooled exhaust gas, which has undergone heat exchange and purging, enters the third heat exchanger together and is then directed to the defoaming device. The defoaming device is used for defoaming the exhaust gas which has undergone heat exchange and purging, to generate a purified gas. The purified gas processed by the defoaming device still carries some heat, and the exhaust gas purified by the heat exchange tank is directed back to the first heat exchanger through the intake port to recycle the process gas, to recover the heat in the gas to the first heat exchanger, to further improve the heat recovery efficiency and reduce energy consumption. Of course, the purified exhaust gas may be discharged to the environment or other treatment device through the air outlet as desired; or a part of the purified exhaust gas is directed back to the first heat exchanger through the intake port to recycle the process gas, while the other part thereof is discharged through the air outlet.

In the meantime, the compressor compresses the first heat exchange medium and discharges the compressed first heat exchange medium into the first heat exchanger. In the first heat exchanger, the first heat exchange medium releases heat to the air flowing through the first heat exchanger to achieve heat exchange between the first heat exchange medium and the air. The condensed first heat exchange medium then passes through a throttle valve to the second heat exchanger and/or the third heat exchanger. As indicated above, the second liquid heat exchange medium in the heat exchange tank absorbs the heat in the exhaust gas, causing temperature rise thereof. Therefore, in the second heat exchanger, the first heat exchange medium can absorb the heat in the second liquid heat exchange medium to evaporate, thereby achieving the heat exchange therebetween, thereby lowering the temperature of the second liquid heat exchange medium. The second liquid heat exchange medium in the heat exchange tank can thus continue to absorb the heat of the exhaust gas discharged into it. By transferring the heat of the exhaust gas to the second liquid heat exchange medium and then transferring the heat energy to the second heat exchanger by the second liquid heat exchange medium, the heat energy transfer with multi-phase transformation is realized and the heat energy transfer efficiency is greatly improved; the gas collecting device collects the cooled exhaust gas discharged from the heat exchange tank and uses the cooled exhaust gas to transfer heat to the first heat exchange medium in the third heat exchanger to further recover the heat in the cooled exhaust gas; heat transfer of the cooled exhaust gas, the second liquid heat exchange medium and the first heat exchange medium can sufficiently recover heat and reduce heat loss, thereby reducing energy consumption. It can be seen from the above process that the inventive process is ingenious and the heat recovery can be quickly and effectively realized through a unique heat exchange way so that the heat energy efficiency ratio COP reaches 3.0-8.0, so as to improve the drying speed and the sludge drying effect is excellent. In addition, the present invention uses the second liquid heat exchange medium to purge the sludge treated exhaust gas so as to effectively purge out the sludge impurities in the exhaust gas, to better ensure the service life of the apparatus, prevent the exhaust gas from clogging or corroding the apparatus during the heat exchange, and increase exhaust heat recovery efficiency.

By means of the recovery of dirty liquid in the heat exchange tank by the dirty liquid separation device, the dirty liquid still carries some heat, the liquid separated by the dirty liquid is re-introduced into the heat exchange tank, thereby not only realizing the liquid recycling, but also achieving recovery of a part of the heat carried by the liquid, thereby further improving the heat recovery efficiency.

The present invention provides one or more of the following technical effects:

(1) After the sludge treated exhaust gas at first passes through the gas distribution device, it is purged by the second liquid heat exchange medium entering the heat exchange tank via the intake line, and at the same time, the second liquid heat exchange medium absorbs the heat energy in the sludge treated exhaust gas to achieve heat transfer, thereby preventing clogging and corrosion of apparatus during the heat exchange process of sludge treated exhaust gas, and improving the efficiency of heat recovery of the sludge treated exhaust gas.

(2) Energy-saving effect is excellent. By means the exhaust gas purification system, efficient heat recovery is achieved and sludge drying efficiency is improved.

(3) In order to ensure more sufficient heat exchange, a third heat exchanger is additionally provided in the present invention, so that the exhaust gas after the heat transfer of the gas and the liquid again undergoes heat transfer with the first heat exchange medium of the third heat exchanger, improving the efficiency of heat recovery.

(4) By transferring the heat of the sludge treated exhaust gas to the second liquid heat exchanging medium and then transferring the heat energy to the second heat exchanging medium by the second liquid heat exchanging medium, the heat energy transfer with multi-phase change is realized, and heat transfer efficiency of the heat energy is greatly increased; by heat energy transfer of the sludge treated exhaust gas, the second liquid heat exchanging medium and the first heat exchanging medium, the invention can sufficiently recover heat, reduce heat loss, thereby reducing energy consumption.

(5) The process is simple with excellent drying effect, heat recovery can be quickly and efficiently achieved, thereby improving the effect and speed.

(6) The sludge treated exhaust gas entering the second heat exchange flow path is treated and heat-recovered in a sealed environment to prevent the generation of odors, prevent secondary pollution, and be very environmentally friendly.

(7) The exhaust gas after heat exchange and purging can be recycled to the intake port 5 for reuse, improving sludge drying efficiency and reducing heat loss.

(8) The purified exhaust gas treated by the defoaming device still carries some heat, can be recycled to the intake port to be reused, and heat recovery can be further achieved.

(9) By providing a dirty liquid separation tank, the dirty water after purging the sludge treated exhaust gas is separated, the separated liquid is recycled to the heat exchange tank and then exchanges heat with the sludge treated exhaust gas to achieve cyclic use of the second liquid heat exchange medium.

Other exemplary embodiments of the present invention will be apparent from the detailed description provided hereinafter. It should be understood that the detailed description and specific examples, while disclosing exemplary embodiments of the invention, are intended only for purpose of illustration and are not intended to limit the scope of the invention.

BRIEF DESCRIPTION OF THE DRAWINGS

At least one embodiment will be described below in conjunction with the following drawings, wherein the same reference numerals refer to the same elements.

REFERENCE NUMERALS

Figure 1:
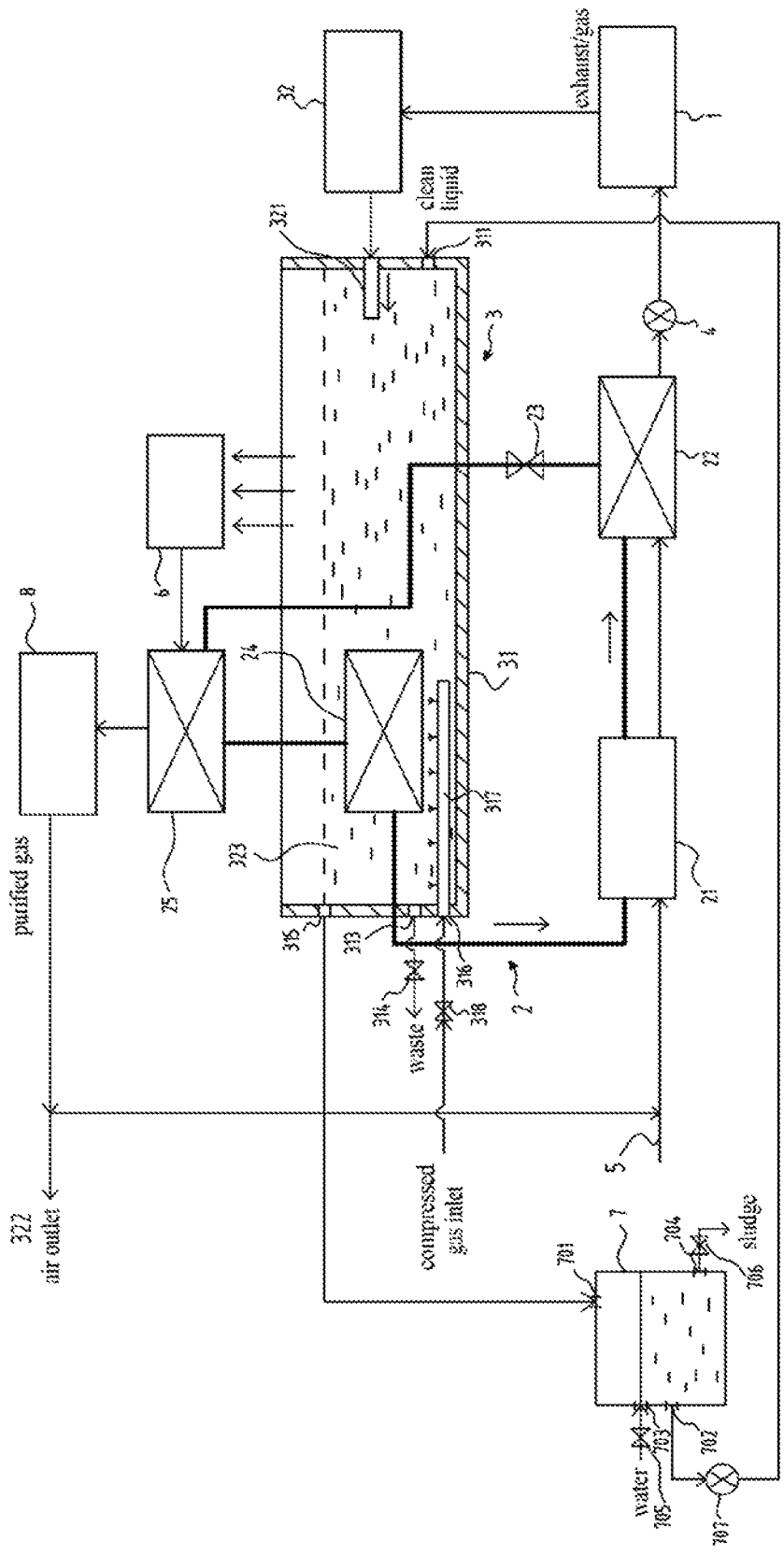
FIG. 1 is a schematic view of a preferred embodiment of an exhaust gas purifying and heat recovering system according to the present invention.

1 sludge drying device
2 first heat exchange flow path
3 second purification and heat exchange flow path
4 ventilation device
5 intake port
6 gas gathering device
7 dirty liquid separation tank
701 dirty water liquid inlet
702 clean liquid outlet
703 clean water inlet
704 sludge outlet
705 control valve
706 control valve
707 pump
8 defoaming device
21 compressor
22 first heat exchanger
23 throttle valve
24 second heat exchanger
25 third heat exchanger
31 heat exchange tank
311 clean liquid inlet
313 waste liquid outlet
314 control valve
315 dirty liquid outlet
316 compressed gas inlet
317 conduit
318 control valve
32 gas distribution device
321 intake line
322 air outlet
323 second liquid heat exchange medium.

DETAILED DESCRIPTION

Figure 2:
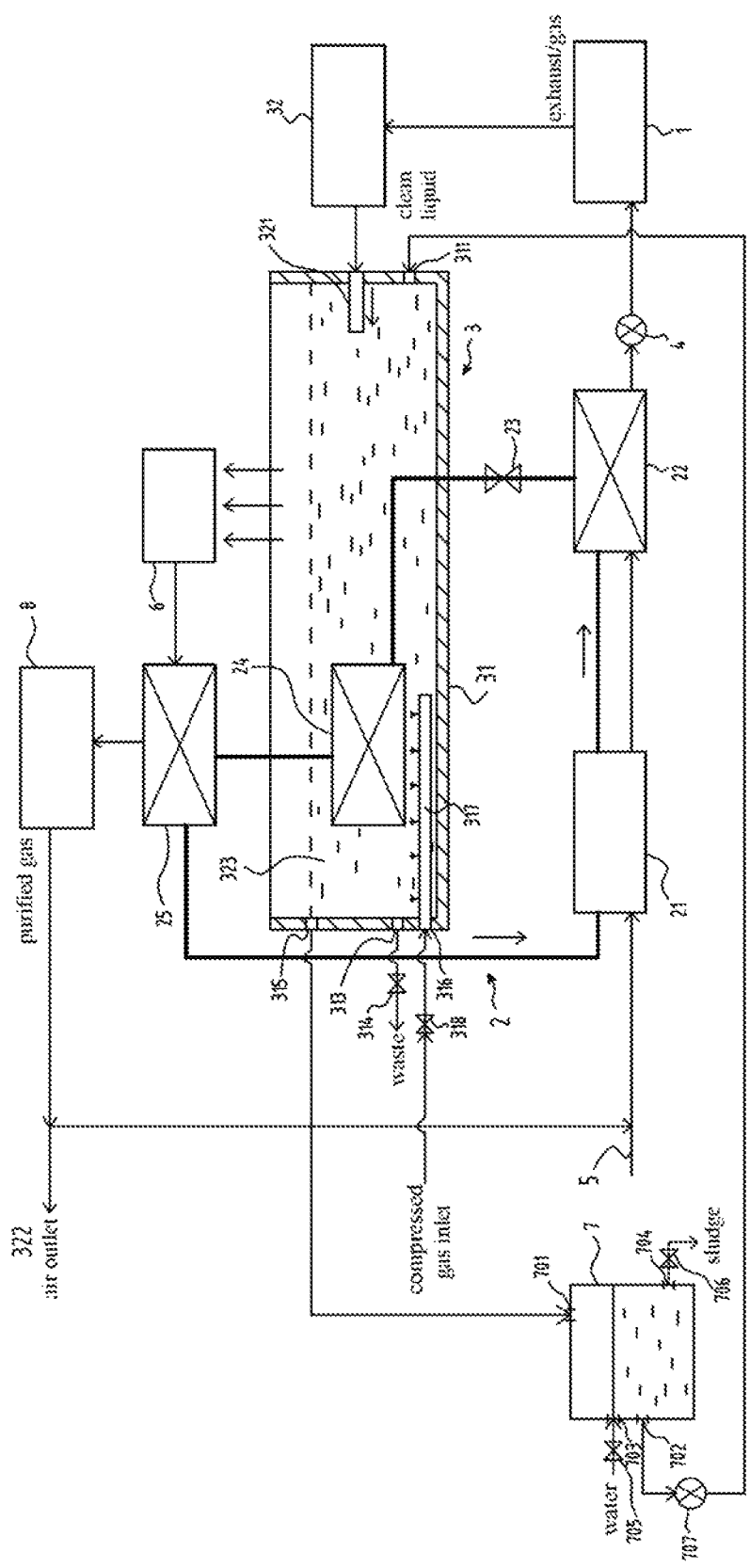
FIG. 2 is a schematic view of another preferred embodiment of an exhaust gas purifying and heat recovering system according to the present invention.
Figure 3:
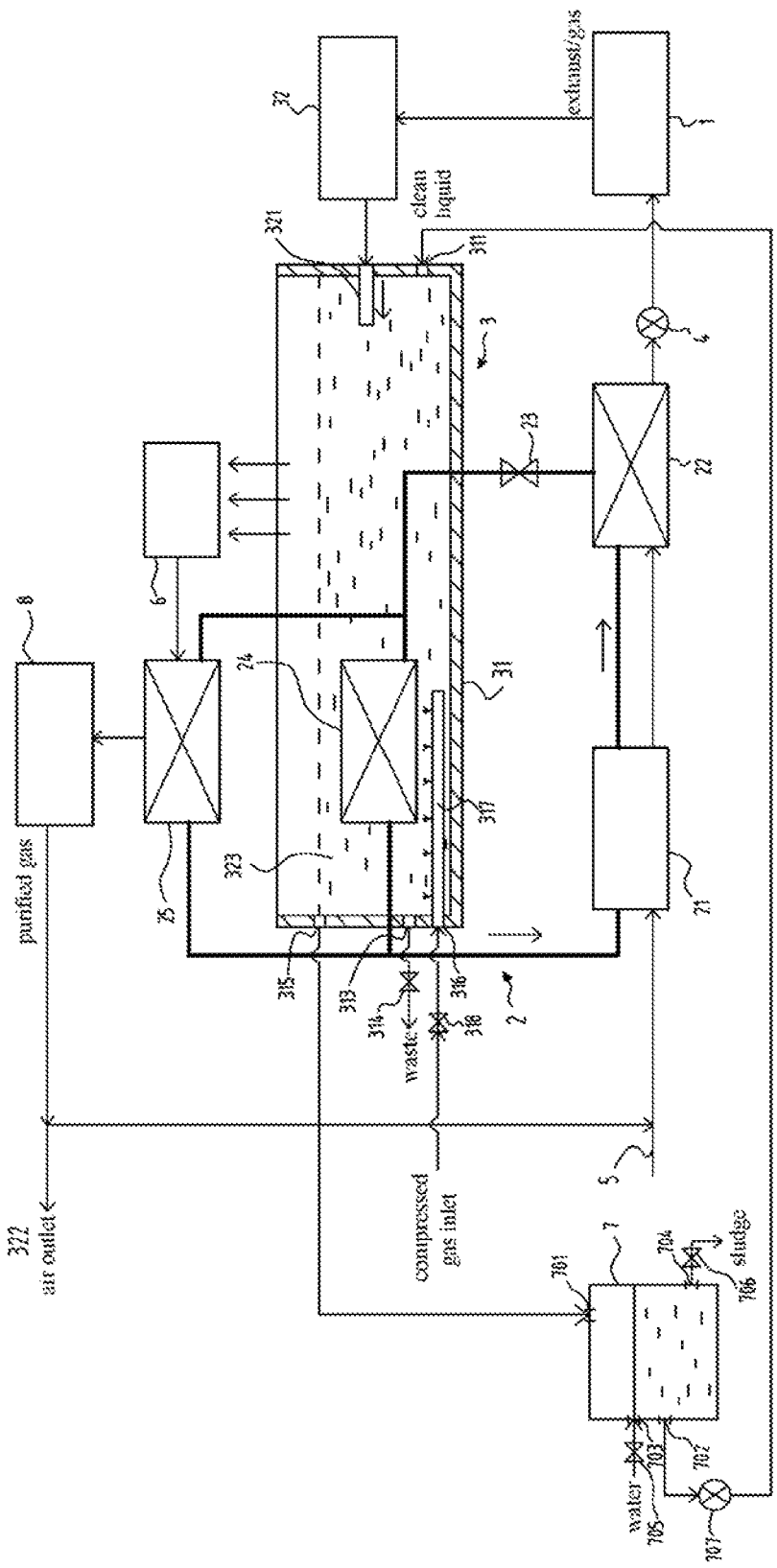
FIG. 3 is a schematic view of yet another preferred embodiment of an exhaust gas purifying and heat recovering system according to the present invention.

The following description is merely exemplary in nature and is in no way intended to limit the invention, its application, or use. Referring to the drawings, FIG. 1 is a schematic view of a preferred embodiment of an exhaust gas purifying and heat recovering system according to the present invention. FIG. 2 is a schematic view of another preferred embodiment of an exhaust gas purifying and heat recovering system according to the present invention. FIG. 3 is a schematic view of yet another preferred embodiment of an exhaust gas purifying and heat recovering system according to the present invention.

As shown in FIG. 1, an exhaust gas purifying and heat recovering system according to the present invention includes a first heat exchange flow path 2 constituted by a heat exchange circuit including a compressor 21, a first heat exchanger 22, a throttle valve 23, and a second heat exchanger 24 arranged in series downstream of the first heat exchanger 22, the first heat exchange medium circulating in the first heat exchange flow path 2 to heat process gas for sludge treatment in the first heat exchanger 22. The first heat exchange flow path 2 further includes a third heat exchanger 25.

As shown in FIG. 1, the second heat exchanger 24 is arranged in series downstream of the third heat exchanger 25. However, the second heat exchanger 24 may also be arranged in series upstream of the third heat exchanger 25, as shown in FIG. 2. In addition, the second heat exchanger 24 may also be arranged in parallel with the third heat exchanger 25, as shown in FIG. 3.

The first heat exchange medium circulates in the heat exchange circuit. The compressor 21 compresses the first heat exchange medium in a gaseous state, and discharges the compressed high-temperature, high-pressure first heat exchange medium to the first heat exchanger 22. The first heat exchange medium is condensed in the first heat exchanger 22 by the process gas (for example, air from the outside) flowing in the first heat exchanger 22, becomes liquid, and the process gas is thus heated.

According to one embodiment of the invention, the first heat exchanger 22 corresponds to a condenser. The condensed first heat exchange medium enters the second heat exchanger 24 and/or the third heat exchanger 25 through the throttle valve 23 in a low temperature and low pressure liquid form. In the second heat exchanger 24 and/or the third heat exchanger 25, the first heat exchange medium absorbs heat from the second purification and heat exchange flow path 3 and evaporates. Therefore, the second heat exchanger 24 and/or the third heat exchanger 25 correspond to an evaporator. The evaporated first heat exchange medium is sucked into the compressor 21 for a new compression cycle. The first heat exchange medium may be, for example, R134a, R407c, R410a, or the like. It will be understood by those skilled in the art that the first heat exchanger 22, the second heat exchanger 24 and the third heat exchanger 25 may be any other suitable type of heat exchanger without departing from the scope of the present invention.

According to a preferred embodiment of the present invention, the process gas at first flows through the compressor 21 before flowing through the first heat exchanger 22, helping to cool the compressor 21 and thus being preheated, thereby increasing the heat recovery efficiency.

In one embodiment of the present invention, a sludge treatment device is disposed downstream of the first heat exchanger 22 for treating the sludge and discharging the exhaust gas. In the process of sludge heat-drying, a large amount of exhaust gas is released. The composition of the exhaust gas is complex and diverse, and is a mixture of various organic-inorganic gases, which, if be directly discharged, can cause serious secondary pollution to the surrounding environment and cause serious harm to human living environment. Because there is waste heat in exhaust gas, it will cause heat loss if be directly discharged. In one embodiment of the invention, the sludge treatment device is shown as a sludge drying device 1. It will be understood by those skilled in the art that the sludge treatment device may also be any other suitable type of sludge treatment device without departing from the scope of the present invention.

The exhaust gas purifying and heat recovering system according to the present invention further includes a second purification and heat exchange flow path 3 including a heat exchange tank 31 accommodating the second liquid heat exchange medium 323. The sludge treated exhaust gas is discharged into the heat exchange tank 31, is purged by the second liquid heat exchange medium 323 in the heat exchange tank 31, and transfers heat to the second liquid heat exchange medium 323, so as to be cooled. The second heat exchanger 24 is disposed inside the heat exchange tank 31 and the second heat exchanger 24 is in heat exchange relationship with the second liquid heat exchange medium in the heat exchange tank 31 to transfer the heat of the second liquid heat exchange medium 323 to the first heat exchange medium in the second heat exchanger 24. In the heat exchange tank 31, the sludge treated exhaust gas not only exchanges heat directly with the second liquid heat exchange medium but also directly exchanges heat with the second heat exchanger 24 and transfers the heat to the first heat exchange medium; therefore, the heat exchange between the sludge treated exhaust gas, the second liquid heat exchange medium and the first heat exchange medium can sufficiently recover the heat in the sludge treated exhaust gas and reduce the heat loss so as to reduce energy consumption. Of course, a plurality of second heat exchangers 24 may be disposed inside the heat exchange tank 31 as needed, and the plurality of second heat exchangers 24 may be arranged in series or in parallel so as to enhance the heat transfer efficiency of the second liquid heat exchange medium 323 to the first heat transfer exchange medium. Sludge treated exhaust gas entering the second purification and heat exchange flow path 3 is treated and heat-recovered in a sealed environment to prevent the generation of odors, eliminate secondary pollution and be very environmentally friendly.

In one embodiment of the invention, the second liquid heat exchange medium is water. However, the second liquid heat exchanging medium is not limited to water, and other suitable liquids may also be used, such as cleaning liquids, ionic liquids and the like.

Sludge treated exhaust gas is purged in heat exchange tank 31 and transfers heat to the second liquid heat exchange medium and is therefore cooled down. The purification of the sludge treated exhaust gas and the recovery of heath is achieved thereby. After being cooled, the cooled exhaust gas in the second liquid heat exchange medium automatically rises above the level of the second liquid heat exchange medium and is collected by the gas gathering device 6.

The second liquid heat exchanging medium, which obtains heat from the sludge treated exhaust gas, then transfers the heat to the first heat exchanging medium flowing in the second heat exchanger 24 via the second heat exchanger 24 to evaporate the first heat exchanging medium.

The exhaust gas purifying and heat recovering system according to the present invention further includes a gas gathering device 6 disposed above the heat exchange tank 31 for collecting the cooled exhaust gas from the heat exchange tank 31 that has undergone heat exchange and purge. The exhaust gas transfers the heat to the second liquid heat-exchange medium 323 in the heat-exchange tank 31, so as to be cooled, thereby recovering the heat. After being cooled, the cooled exhaust gas in the second liquid heat exchange medium automatically rises above the level of the second liquid heat exchange medium and is collected by the gas gathering device 6. The exhaust gas that has undergone heat exchange and purge and that is collected by the gas gathering device 6 flows through the third heat exchanger 25 for heat exchange with the first heat exchange medium flowing through the third heat exchanger 25. Of course, a plurality of third heat exchangers 25 may be disposed above the heat exchange tank 31 as required. The plurality of third heat exchangers 25 may be arranged in series or in parallel, through which the cooled exhaust gas that has undergone heat exchange and purge and that is collected by the gas gathering device 6 flows, to exchange heat with the first heat exchange medium of the plurality of heat exchangers to increase heat exchange efficiency.

The first heat exchange medium flowing through the second heat exchanger 24 and/or the third heat exchanger 25 is heated and vaporizes, and is directed back to the first heat exchanger 22 to repeat the cycle process.

The exhaust gas purifying and heat recovering system according to the present invention further includes a fourth purified gas recovery flow path through which the exhaust gas purified by the heat exchange tank 31 is directed through the intake port 5 back to the first heat exchanger 22 to recycle the process gas. Of course, the purified exhaust gas may be merely discharged to the environment or other treatment device through the air outlet 322 as needed; or a part of the purified exhaust gas is directed back to the first heat exchanger 22 through the intake port 5 to recycle the process gas, while the other part is vented from the air outlet 322. The fourth purified gas recovery flow path may include any suitable device including a conduit, a control valve, and a check valve.

In one embodiment of the invention, the defoaming device 8 is arranged downstream of the third heat exchanger 25. The defoaming device 8 is for defoaming the heat exchanged heat exchanged and purged exhaust gas to generate a purified gas. In one embodiment of the invention, the purified gas is directed back to the compressor 21 or the first heat exchanger 22. The purified gas processed by the defoaming device 8 still carries some heat, can be recycled to the intake port 5 for reuse, and further heat recovery can be achieved. Of course, the purified gas may be merely discharged to the environment or other treatment device through the air outlet 322 as needed; or a part of the purified gas is directed back to the first heat exchanger 22 through the intake port to circulate the process gas, while the other part is discharged by the air outlet 322.

The purified gas may also be discharged to the environment via the air outlet 322. The defoaming device 8 includes, but is not limited to, a screen demister, a packing demister, and the like.

The exhaust gas purifying and heat recovering system according to the present invention further includes a third dirty liquid separation flow path. The third dirty liquid separation flow path includes a dirty liquid separation tank 7. In one embodiment of the present invention, the dirty liquid separation tank 7 is disposed between the dirty liquid outlet 315 of the heat exchange tank 31 and the clean liquid inlet 311 of the heat exchange tank 31 for separating the dirty water after purging the sludge treated exhaust gas, the separated liquid is directed again to the clean liquid inlet 311 of the heat exchange tank. The dirty liquid separating tank 7 includes a dirty liquid inlet 701, a clean liquid outlet 702, a clean water inlet 703, and a sludge outlet 704. The clean liquid inlet 701, the liquid outlet 702, and the clean water inlet 703 are all provided in the upper part of the dirty liquid separation tank 7 while the sludge outlet 704 is provided in the bottom of the dirty liquid separation tank 7. A control valve 705 is provided at the clean water inlet 703, a pump 707 is provided at the clean liquid outlet 702, and a control valve 706 is provided at the sludge outlet 704. The dirty liquid inlet 701 is in fluid communication with the dirty liquid outlet 315 of the heat exchange tank 31 to receive the dirty liquid discharged from the heat exchange tank 31. The clean liquid outlet 702 is in fluid communication with the clean liquid inlet 311 of the heat exchange tank 31 to return the clean liquid (liquid removed of sludge) separated in the dirty liquid separation tank 7 to the heat exchange tank 31. The clean water inlet 703 is used to inject fresh liquid (that is, the second liquid heat exchange medium) into the dirty liquid separation tank 7.

The dirty water leaving the heat exchange tank 31 passes through the dirty liquid inlet 701 into the dirty liquid separation tank 7. The dirty water is precipitated and separated in the dirty liquid separation tank 7, and the sludge is precipitated on the bottom of the dirty liquid separation tank 7. After the dirty water is precipitated in the dirty liquid separation tank 7 for sufficient time, the pump 707 is turned on to direct the separated clean liquid to the clean liquid inlet 311 of the heat exchange tank. When sludge settling in the dirty liquid separation tank 7 reaches a certain amount, the control valve 706 is opened to discharge the sludge from the sludge outlet 704. When the level of the dirty liquid separation tank is below a predetermined level, the control valve 705 may be opened to introduce clean water from the clean water inlet 703 to replenish the clean water to raise the level to a predetermined level.

Optionally, the third dirty liquid separation flow path may further include a pump 707 to pump the clean liquid from the dirty liquid separation tank 7 into the heat exchange tank 31.

Optionally, an additional heat exchanger (not shown) may be provided between the dirty liquid outlet 315 of the heat exchange tank 31 and the dirty liquid inlet 701 of the dirty liquid separation tank 7. The first heat exchange medium flows through the additional heat exchanger so as to transfer the heat in the dirty liquid flowing out of the heat exchange tank 31 to the first heat exchange medium to further improve the heat recovery efficiency.

According to the preferred embodiment of the present invention, a gas distribution device 32 is disposed upstream of the intake line of the heat exchange tank 31 for allowing the sludge treated exhaust gas to uniformly enter the heat exchange tank 31. The gas distribution device 32 is in gas communication with the heat exchange tank 31 and the sludge drying device 1 through conduits. In particular, the intake line 321 connecting the gas distribution device 32 and the heat exchange tank 31 is inserted below the level of the second liquid heat exchange medium in the heat exchange tank 31, and the intake line 321 is inserted at a depth sufficient to ensure sufficient heat exchange between the gas and liquid. According to the present invention, the sludge treated exhaust gas at first passes through the gas distribution device 32 and then enters the second liquid heat exchanging medium in the heat exchange tank 31 via the intake line 321 for purging, and at the same time, the second liquid heat exchanging medium absorbs the heat energy in the sludge treated exhaust gas to realize heat transfer, so as to prevent clogging and corrosion of apparatus during heat exchange of sludge treated exhaust gas and improve the heat recovery efficiency of exhaust gas.

According to a preferred embodiment of the present invention, the heat exchange tank 31 includes a clean liquid inlet 311 and a waste liquid outlet 313 provided near the bottom of the heat exchange tank 31, and a dirty liquid outlet 315 provided in an upper portion of the heat exchange tank 31.

The heat exchange tank also includes a control valve 314. Since the exhaust gas contains sludge impurities, during the gas-liquid interaction in the heat exchange tank 31, the sludge impurities in the exhaust gas are purged by the second liquid heat exchange medium 323 and remain in the second liquid heat exchange medium 323. In order to remain the cleanness the second liquid heat exchange medium 323 and to ensure heat exchange efficiency, the pump 707 may be turned on to introduce a second liquid heat exchange medium (eg, water) from the clean liquid inlet 311 at the bottom of the heat exchange tank 31 into the heat exchange tank 31. When the level in the heat exchange tank 31 reaches the dirty liquid outlet 315, the second liquid heat exchange medium 323 flows out of the dirty liquid outlet 315.

As the sludge impurities in the liquid continue to increase, the liquid in the heat exchange tank 31 becomes dirty, thereby affecting the heat exchange and purging of the incoming exhaust gas, and some devices also require service or replacement. To this end, the pump 707 may be shut down to stop the water supply, and the control valve 314 is opened to allow the liquid to be discharged from the waste liquid outlet 313 at the bottom of the heat exchange tank 31, then, reverse operation is performed to re-fill the heat exchange tank 31.

According to a preferred embodiment of the present invention, the exhaust gas purifying and heat recovering system further includes a fifth compressed gas flow path including a control valve 318, a compressed gas inlet 316 disposed near the bottom of the heat exchange tank 31, and a conduit 317 disposed near the bottom of the heat exchange tank 31. The compressed gas enters the conduit 317 via the compressed gas inlet 316 and is injected into the second liquid heat exchange medium of the heat exchange tank 31 through a plurality of small holes provided in the conduit and then enters the gas collecting device 6 or the third heat exchanger 25 together with the cooled exhaust gas subjected to heat exchange and purging.

If the sludge impurities in the heat exchange tank 31 accumulate enough to affecting the efficiency of the heat exchange of the second heat exchanger 24, the control valve 318 may be opened to allow compressed gas to flow from the compressed gas inlet 316 to the conduit 317 provided near the bottom in the heat exchange tank 31. Thereafter, the compressed gas is ejected through a plurality of small holes provided in the conduit 317, and the sludge impurities in the bottom of the heat exchange tank 31 are agitated to facilitate discharge of sludge impurities from the dirty liquid outlet 315. The compressed gas leaving the second liquid heat exchange medium 323 is collected in the gas gathering device 6 above the heat exchange tank 31 and then enters the third heat exchanger 25 together with the cooled exhaust gas that has undergone heat exchange and purging in the gas gathering device 6. Then, the exhaust gas is directed back to the first heat exchanger 22 or to the compressor 21; of course, the purified exhaust gas may be merely discharged to the environment or other treatment device via the air outlet 5, as needed; or a part of the purified exhaust gas is directed back to the first heat exchanger 22 through the intake port 5 to recycle the process gas while the other part is discharged from the air outlet 322.

According to a preferred embodiment of the present invention, the gas gathering device 6 may not be provided so that the cooled exhaust gas, which has undergone heat exchange and purging, passes directly through the third heat exchanger 25 for heat exchange with the first heat exchange medium flowing through the third heat exchanger 25.

Optionally, an additional heat exchanger (not shown in the figure) may be provided between the defoaming device 8 and the first heat exchanger 22. The first heat exchange medium flows from the additional heat exchanger so as to transfer the heat in the exhaust gas flowing out from the defoaming device 8 to the first heat exchange medium to further improve the heat recovery efficiency.

According to a preferred embodiment of the present invention, the second heat exchanger 24 is placed directly in the heat exchange tank 31, thereby achieving sufficient heat exchange.

According to a preferred embodiment of the invention, the process gas is air. However, the process gas may also be any other gas suitable for the present invention.

According to a preferred embodiment of the invention, the process gas is fed from the first heat exchanger 22 to the sludge treatment device by the ventilation device 4. The ventilation device 4 is preferably a blower device and/or a draft device.

According to a preferred embodiment of the present invention, the sludge treatment device is a sludge drying device 1. However, the sludge treatment device may also be any other sludge treatment device. The exhaust gas, that is, the waste gas after the drying treatment, is discharged from the sludge drying device 1 to the second purification and heat exchange flow path 3.

When the above-described exhaust gas purifying and heat recovering system is put into use, the process gas is taken from the atmosphere of the surrounding environment, and the following operation steps are generally employed.

First, the first heat exchange flow path 2 and the second purification and heat exchange flow path 3 are activated. The pump 707 is turned on to inject the second liquid heat exchange medium 323, for example, water, into the heat exchange tank 31 from the clean liquid inlet 311. Under normal conditions, the second liquid heat exchanging medium 323 reaches a predetermined level in the heat exchange tank 31. Then, the pump 707 is turned off.

Air enters from the intake port 5, flows at first through the compressor 21 and then to the first heat exchanger 22. The first heat exchanger 22 heats the air, and the heated air is pressurized by the ventilation device 4 (for example, a blower and/or a draft fan) and is then fed to the sludge drying device 1. In the sludge drying device 1, the heated air is used as a process gas to participate in sludge drying treatment. After the heated air becomes an exhaust gas with sludge impurities, it is discharged from the sludge drying device 1, and flows into the gas distribution device 32 via a conduit. The sludge treated exhaust gas is collected in the gas distribution device 32 and discharged into the second liquid heat exchange medium 323 in the heat exchange tank 31 through the intake line 321 so as to transfer the heat in the sludge treated exhaust gas to the second liquid heat exchange medium 323 to achieve the gas-liquid heat exchange, to achieve heat recovery of the heat in the exhaust gas. During this heat exchange, the sludge treated exhaust gas is lowered in temperature and automatically flows upward above the level of the second liquid heat exchange medium 323 and is then collected by the gas gathering device 6.

At the same time, the compressor 21 compresses the first heat exchange medium and discharges the compressed first heat exchange medium into the first heat exchanger 22. In the first heat exchanger 22, the first heat exchange medium releases heat to the air flowing through the first heat exchanger 22 to achieve heat exchange between the first heat exchange medium and the air. The condensed first heat exchange medium then passes through the throttle valve 23 to the second heat exchanger 24 and/or the third heat exchanger 25. As indicated above, the second liquid heat exchange medium 323 in the heat exchange tank 31 absorbs the heat in the sludge treated exhaust gas, causing its temperature to rise. Therefore, the first heat exchange medium can absorb the heat in the second liquid heat exchanging medium 323 in the second heat exchanger 24 to evaporate, thereby achieving the heat exchange therebetween, so as to lower the temperature of the second liquid heat exchanging medium 323. The second liquid heat exchange medium 323 in the heat exchange tank 31 can therefore continue to absorb the heat of the sludge treated exhaust gas discharged into it. By transferring the heat of the sludge treated exhaust gas to the second liquid heat exchanging medium and then transferring the heat energy to the second heat exchanger by the second liquid heat exchanging medium, heat transfer of multiphase change is achieved and the heat transfer efficiency is greatly improved; by means of the heat exchange between the sludge treated exhaust gas, the second liquid heat exchange medium and the first heat exchange medium, the heat can be sufficiently recovered and the heat loss is reduced, so as to reduce the energy consumption.

Since the exhaust gas contains sludge impurities, during the gas-liquid interaction in the heat exchange tank 31, the sludge impurities in the exhaust gas are purged by the second liquid heat exchange medium 323 and remain in the second liquid heat exchange medium 323.

Subsequently, in order to keep the cleanness of the second liquid heat exchange medium 323, the pump 707 may be turned on as needed to introduce the second liquid heat exchange medium 323, such as water, into the clean liquid inlet 311 at the bottom of the heat exchange tank 31. The second liquid heat exchange medium 323 is discharged from the dirty liquid outlet 315 when the level in the heat exchange tank 31 reaches the dirty liquid outlet 315. Under normal conditions, the second liquid heat exchanging medium 323 reaches a predetermined level in the heat exchange tank 31. Then, the pump 707 is turned off.

As the sludge impurities in the liquid continue to increase, the liquid in the heat exchange tank 31 becomes dirty, which in turn affects heat exchange and purging of the incoming exhaust gas, and some devices also require service or replacement. To this end, the pump 707 may be turned off to stop the water supply, and the control valve 314 is opened to allow the liquid to be discharged from the waste liquid outlet 313 at the bottom of the heat exchange tank 31. Then, reverse operation is performed to re-fill the heat exchange tank 31.

If the sludge impurities in the heat exchange tank 31 accumulate enough to affecting the efficiency of the heat exchange of the second heat exchanger 24, the control valve 318 may be opened to allow compressed gas to flow from the compressed gas inlet 316 to the conduit 317 provided near the bottom in the heat exchange tank 31. Thereafter, the compressed gas is ejected through a plurality of small holes provided in the conduit 317, and the sludge impurities in the bottom of the heat exchange tank 31 are agitated to facilitate discharge of sludge impurities from the dirty liquid outlet 315. The compressed gas leaving the second liquid heat exchange medium 323 is collected in the gas gathering device 6 above the heat exchange tank 31 and then enters the third heat exchanger 25 together with the cooled exhaust gas that has undergone heat exchange and purging in the gas gathering device 6, and then is directed to the defoaming device 8. The defoaming device 8 is for defoaming the exhaust gas that has undergone heat exchange and purge, to generate purified gas. In one embodiment of the invention, the purified gas is directed back to the compressor 21 or to the first heat exchanger 22. The purified gas processed by the defoaming device 8 still carries some heat, and can be recycled to the intake port 5 for reuse, and heat recovery can be further achieved. Of course, the purified gas may be merely discharged to the environment or other treatment device via the air outlet 5, as needed; or a part of the purified gas is directed back to the first heat exchanger 22 through the intake port 5 to recycle the process gas while the other part is discharged from the air outlet 322.

The dirty water leaving the heat exchange tank 31 passes through the dirty water inlet 701 into the dirty liquid separation tank 7. The dirty water is precipitated and separated in the dirty liquid separation tank 7, and the sludge is precipitated at the bottom of the dirty liquid separation tank 7. After the dirty water is precipitated in the dirty liquid separation tank 7 for a sufficient time, the pump 707 is turned on to direct the separated clean liquid to the clean liquid inlet 311 of the heat exchange tank. When sludge settling in the dirty liquid tank 7 reaches a certain amount, the control valve 706 is opened to discharge the sludge from the sludge outlet 704. When it is necessary to purge the sludge at the bottom of the dirty liquid separation tank 7, the control valve 705 may be opened to introduce clean water from the clean water inlet 703 to flush the sludge at the bottom of the dirty liquid separation tank 7. By providing the dirty liquid separation tank 7, the dirty water after purging the sludge treated exhaust gas is separated, the separated liquid is recycled to the heat exchange tank 31 and then exchanges heat with the exhaust gas, so as to recycle the second liquid heat exchange medium.

The invention has described certain preferred embodiments and variations thereof. Other variations and changes will occur to those skilled in the art upon reading and understanding the specification. Therefore, it is intended that the invention not be limited to the particular embodiment disclosed as the best mode contemplated for carrying out the invention, but that the invention will include all embodiments falling within the scope of the appended claims.

The invention claimed is:

1. An exhaust gas purifying and heat recovering system for sludge treatment, comprising:
   a first heat exchange flow path including a first heat exchanger, and a second heat exchanger and a third heat exchanger arranged downstream of the first heat exchanger, a first heat exchange medium is circulated in the first heat exchange flow path, to heat process gas for sludge treatment in the first heat exchanger, the heated process gas is directed to a sludge treatment device generating a sludge treated exhaust gas;
   a second purification and heat exchange flow path including a heat exchange tank containing a second liquid heat exchange medium, the sludge treated exhaust gas is discharged into the heat exchange tank, is purged by the second liquid heat exchange medium in the heat exchange tank, hence, generating a dirty liquid, and transfers the heat to the second liquid heat exchange medium so as to be cooled, the second heat exchanger is in heat exchange relationship with the second liquid heat exchange medium in the heat exchange tank to transfer heat of the second liquid heat exchange medium to the first heat exchange medium in the second heat exchanger;
   a fourth purified gas recovery flow path, the cooled exhaust gas from the heat exchange tank flows through the third heat exchanger to exchange heat with the first heat exchange medium flowing through the third heat exchanger, and flows through the fourth purified gas recovery flow path, at least a portion of the exhaust gas after being heat exchanged is directed back to the first heat exchanger via an intake port to recycle the process gas;
   a third dirty liquid separation flow path including a dirty liquid separation tank provided between a dirty liquid outlet of the heat exchange tank and a clean liquid inlet of the heat exchange tank, for separating the dirty liquid after purging the sludge treated exhaust gas, and the separated liquid is again directed to the clean liquid inlet of the heat exchange tank; and
   a gas distribution device disposed upstream of an intake conduit of the heat exchange tank for receiving the sludge treated exhaust gas from the sludge treatment device and for enabling the sludge-treated exhaust gas to evenly enter the heat exchange tank.

2. The exhaust gas purifying and heat recovering system according to claim 1, further comprising a gas gathering device disposed above the heat exchange tank for collecting the cooled exhaust gas from the heat exchange tank, the cooled exhaust gas collected by the gas gathering device flows through the third heat exchanger for heat exchanging with the first heat exchange medium flowing through the third heat exchanger before the exhaust gas after being heat exchanged, is directed back to the first heat exchanger.

3. The exhaust gas purifying and heat recovering system according to claim 1, wherein the second heat exchanger is arranged in series upstream of the third heat exchanger.

4. The exhaust gas purifying and heat recovering system according to claim 1, wherein the second heat exchanger is arranged in parallel with the third heat exchanger.

5. The exhaust gas purifying and heat recovering system according to claim 1, wherein a defoaming device is arranged downstream of the third heat exchanger for defoaming the exhaust gas after being heat exchanged, before the exhaust gas is directed back to the first heat exchanger.

6. The exhaust gas purifying and heat recovering system according to claim 1, wherein the first heat exchange flow path is constituted by a heat exchange circuit comprising a compressor arranged upstream of the first heat exchanger and a throttle valve arranged downstream of the first heat exchanger and upstream of the second heat exchanger, the compressor is used for compressing the first heat exchange medium and directing the compressed first heat exchange medium to the first heat exchanger, wherein the first heat exchange medium heats the process gas in the first heat exchanger and then flows into the second heat exchanger via the throttle valve.

7. The exhaust gas purifying and heat recovering system according to claim 1, wherein the heat exchange tank includes the clean liquid inlet and a waste liquid outlet disposed near the bottom of the heat exchange tank, and a wherein the dirty liquid outlet is disposed at an upper portion of the heat exchange tank.

8. The exhaust gas purifying and heat recovering system according to claim 1, wherein the exhaust gas purifying and heat recovering system further includes a fifth compressed gas flow path including a compressed gas inlet disposed near the bottom of the heat exchange tank, a control valve, a conduit near the bottom of the heat exchange tank, the control valve is configured to introduce compressed gas into the conduit via the compressed gas inlet as required and to inject compressed gas into the second liquid heat exchange medium of the heat exchange tank through a plurality of apertures provided on the conduit, and then to discharge the compressed gas with the cooled exhaust gas.

9. The exhaust gas purifying and heat recovering system according to claim 1, wherein the second liquid heat exchange medium is one or more of water, cleaning liquid and ionic liquid.

10. The exhaust gas purifying and heat recovering system according to claim 1, wherein the second heat exchanger is disposed inside the heat exchange tank.

11. The exhaust gas purifying and heat recovering system according to claim 1, wherein the sludge treated exhaust gas is discharged into the heat exchange tank below a level of the second liquid heat exchange medium in the heat exchange tank, the heat exchange tank is provided with an intake conduit below the level.

12. The exhaust gas purifying and heat recovering system according to claim 1, wherein the process gas is air, the process gas is fed from the first heat exchanger to the sludge treatment device by a ventilation device, wherein the sludge treatment device is a sludge drying device.

13. The exhaust gas purifying and heat recovering system according to claim 1, wherein the second heat exchanger is arranged in series downstream of the third heat exchanger.

14. A method for using the exhaust gas purifying and heat recovering system of claim 1, the method comprising:
 filling the heat exchange tank with the second liquid heat exchange medium;
 activating the first heat exchange flow path and the second purification and heat exchange flow path, such that the process gas is heated in the first heat exchanger and then sent to the sludge treatment device, the sludge treated exhaust gas discharged from the sludge treatment device is input into the heat exchange tank such that the sludge treated exhaust gas is purged by the second liquid heat exchange medium and transfers the heat to the second liquid heat exchange medium, so as to be cooled down,
 flowing the cooled exhaust gas from the heat exchange tank through the third heat exchanger for heat exchange with the first heat exchange medium flowing through the third heat exchanger, and through the fourth purified gas recovery flow path, at least a portion of the exhaust gas after heat exchange is directed back to the first heat exchanger through the intake port to recycle the process gas;
 separating the dirty liquid after purging the sludge treated exhaust gas using the dirty liquid separation tank; and
 directing the separated liquid again to the clean liquid inlet of the heat exchange.

15. The method according to claim 14, further comprising: disposing a gas gathering device above the heat exchange tank for collecting the cooled exhaust gas from the heat exchange tank, the cooled exhaust gas collected by the gas gathering device flows through the third heat exchanger for exchanging heat with the first heat exchange medium flowing through the third heat exchanger before the exhaust gas, after being heat exchanged, is directed back to the first heat exchanger.

16. The method according to claim 14, wherein the second heat exchanger is arranged in series upstream or downstream of the third heat exchanger.

17. The method according to claim 14, wherein the second heat exchanger is arranged in parallel with the third heat exchanger.

18. The method according to claim 14, wherein a defoaming device is arranged downstream of the third heat exchanger for defoaming the exhaust gas, after being heat exchanged, before the exhaust gas is directed back to the first heat exchanger.

19. The method according to claim 14, wherein, when needs to be replenished, the second liquid heat exchange medium is introduced into the heat exchange tank from the clean liquid inlet;
 when a level in the heat exchange tank reaches the dirty liquid outlet, the dirty liquid flows out from the dirty liquid outlet;
 when the heat exchange tank needs to be purged, the second liquid heat exchange medium is discharged from the waste liquid outlet.

20. The method according to claim 14, further comprising:
 providing a fifth compressed gas flow path including a compressed gas inlet disposed near the bottom of the heat exchange tank, a control valve, a conduit near the bottom of the heat exchange tank, the control valve is configured to introduce compressed gas into the conduit via the compressed gas inlet as required and to inject compressed gas into the second liquid heat exchange medium of the heat exchange tank through a plurality of apertures provided on the conduit, and then to discharge the compressed gas with the cooled exhaust gas.

* * * * *